L. RUNDELL.
Clips for Vehicle Tires.
No. 152,516. Patented June 30, 1874.
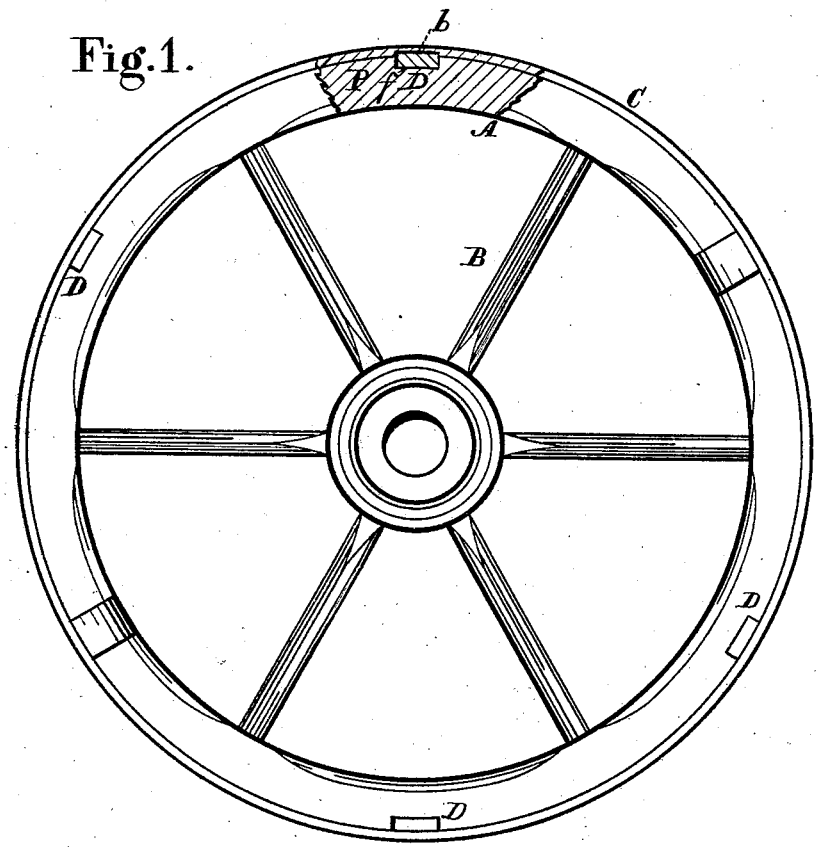
Fig. 2.
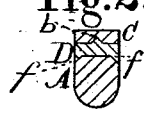
Fig. 4.
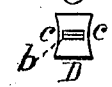
Witnesses,
J. H. Elliott.
Frank W. Barker.
Inventor,
Luman Rundell,
Per G. L. Chapin,
Atty.

UNITED STATES PATENT OFFICE.

LUMAN RUNDELL, OF NEW BALTIMORE, NEW YORK.

IMPROVEMENT IN CLIPS FOR VEHICLE-TIRES.

Specification forming part of Letters Patent No. 152,516, dated June 30, 1874; application filed April 4, 1874.

*To all whom it may concern:*

Be it known that I, LUMAN RUNDELL, of the town of New Baltimore, county of Green, State of New York, have invented an Improvement in Clips for Setting Wagon-Tires, of which the following is a specification:

The object of the present invention is to provide means for securing tires to wheels without the employment of bolts or rivets; and the nature of the invention consists of metal clips, which are countersunk in the fellies, and provided with flanges extending on their sides, and with concave edges to hold the clips in place, and with spurs or lugs, which fit into corresponding indentations in the tire to hold it in place, as the whole is hereinafter described and shown.

In the drawing, Figure 1 is an elevation of a wagon-wheel with a portion of one felly broken away to show the position of one of my improved clips; Fig. 2, a section through the felly, tire, and clip. Fig. 4 shows a top view or a view of that part of the clip fitting the tire.

The wheel B is constructed first similarly to the ordinary wheel—that is, with hub, spokes, and fellies. The clips D I prefer to make of malleable iron; but they may be made of other metal. The edges C fitting into the fellies are concave, as shown, to aid in holding the clips in place, and the tapering flanges project onto the sides of the fellies, as shown, for greater security. On the outer side of the clip is formed a spur or lug, $b$, which fits into an indentation in the inside of the tire, to hold it to the fellies.

To set tires with my clips, the main plate D, provided with concave sides and tapering flanges, is to be set into half of the fellies of an ordinary wheel, where there are from twelve to sixteen fellies in a wheel, or between every alternate spoke when bent fellies are used, care being taken to cut away no more wood than necessary to set the clips closely in the fellies. After all the clips are set, the tire is to have formed in it indentations, to receive the spurs or lug C. The tire is then heated, and put on in the usual manner. The clips hold the tire firmly in place, and the tires hold the clips in the fellies.

As to utility, I would say that the device has been tried, and tires set in this manner hold the wheels in a firm manner, and they are very strong and solid.

I am aware that slotted plates have been put between fellies and tire, and that the alternate prongs between the slots have been bent down against the fellies and the other bent against the tire, to hold the latter in place, as shown in the patent granted to Whitney and Edwards May 12, 1863; and I am also aware that plugs provided with outwardly-projecting spurs have been inserted in the peripheries of fellies, so that the spurs would enter depressions in the tires, as shown in the patent granted to A. C. Barnes, May 5, 1867.

I claim—

A clip for setting tires consisting of the plate D, spur $b$, and flanges $f$, in combination with the tire C and wheel A B, substantially as and for the purpose set forth.

LUMAN RUNDELL.

Witnesses:
   JACOB C. VAN DYCK,
   ALEX. REED.